March 20, 1928.
A. N. CRAMER
1,662,848
GLASS FORMING MACHINE
Filed May 21, 1923
5 Sheets-Sheet 1
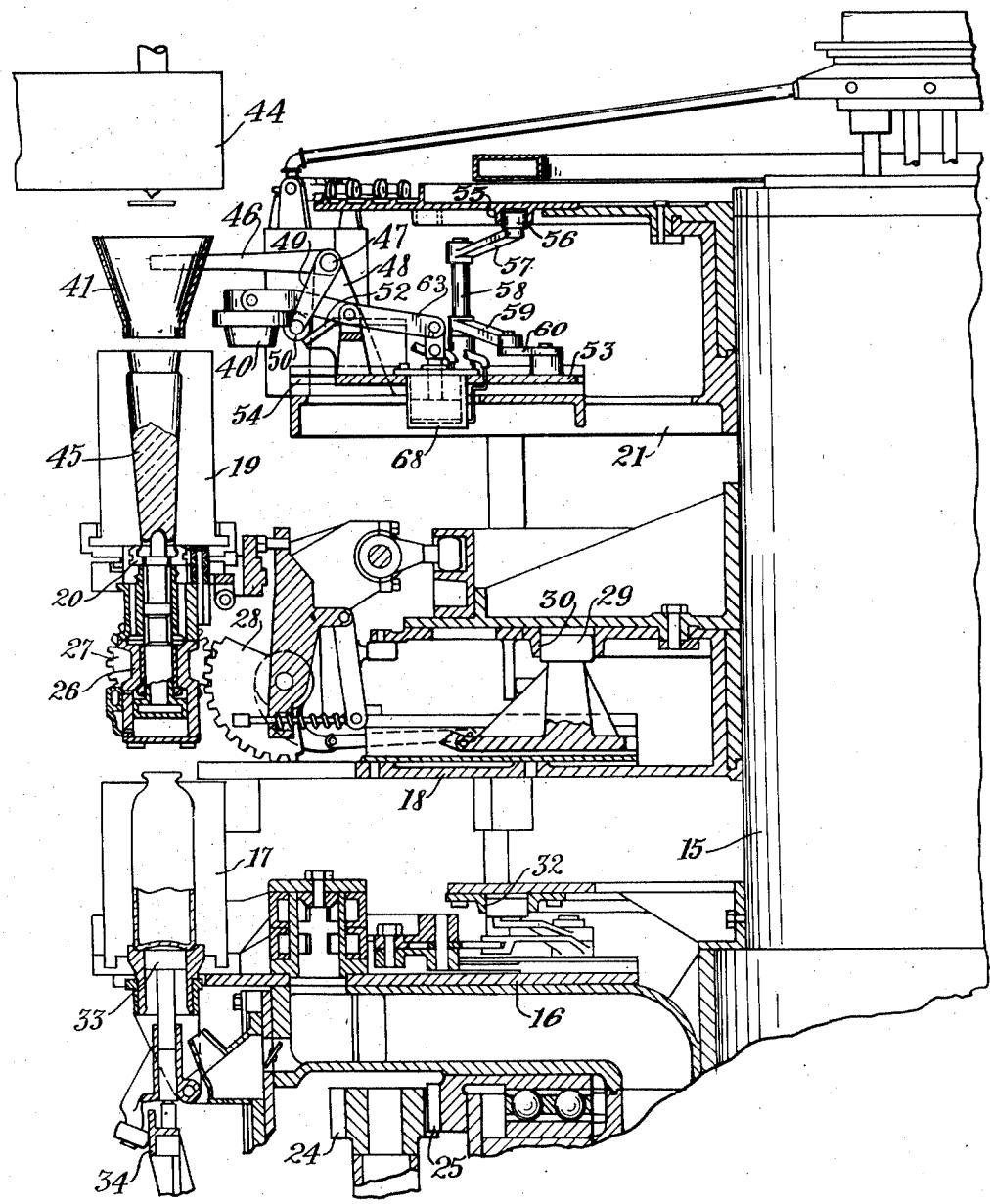
FIG-1-
INVENTOR
A. N. Cramer
By J. F. Rule
His attorney

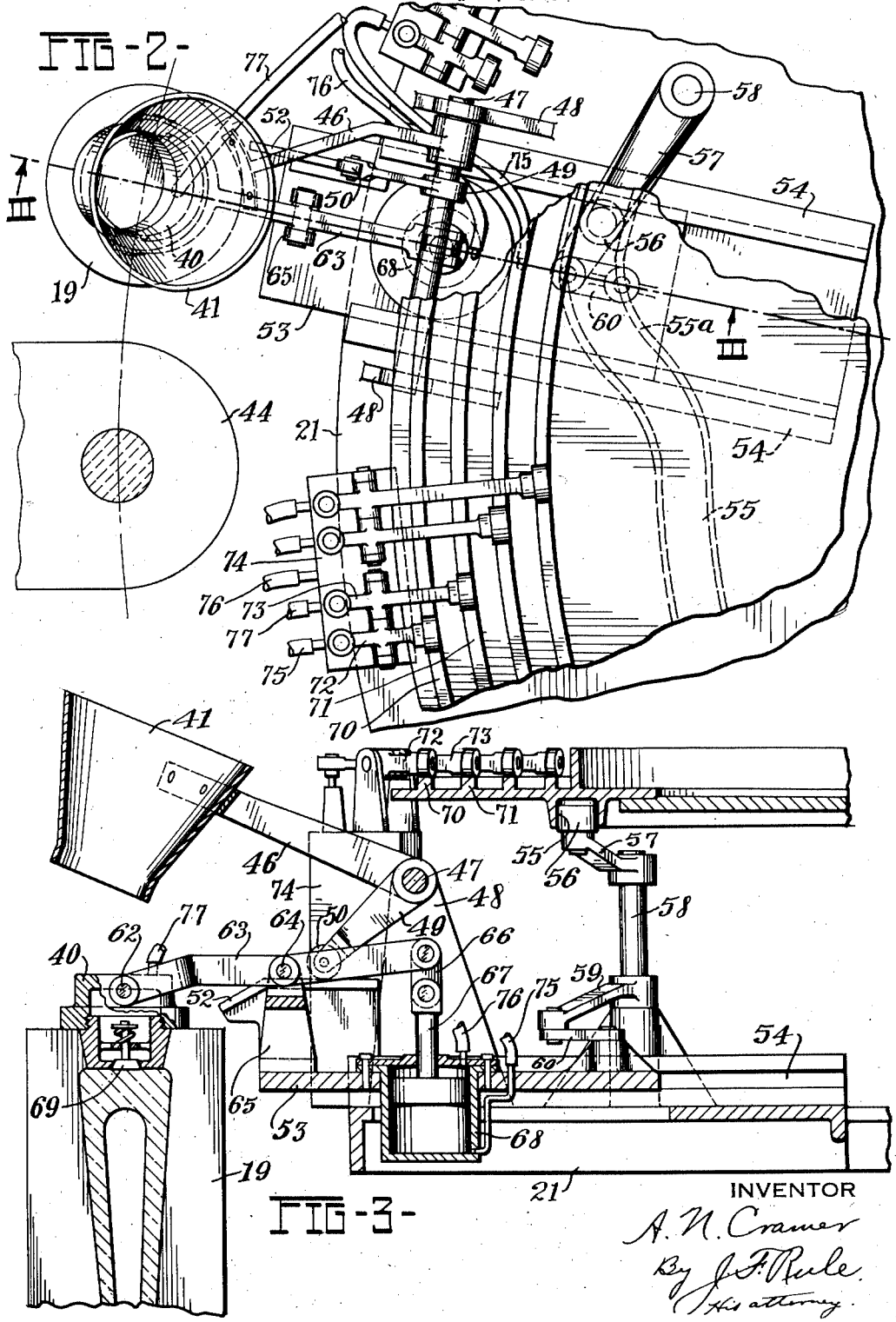

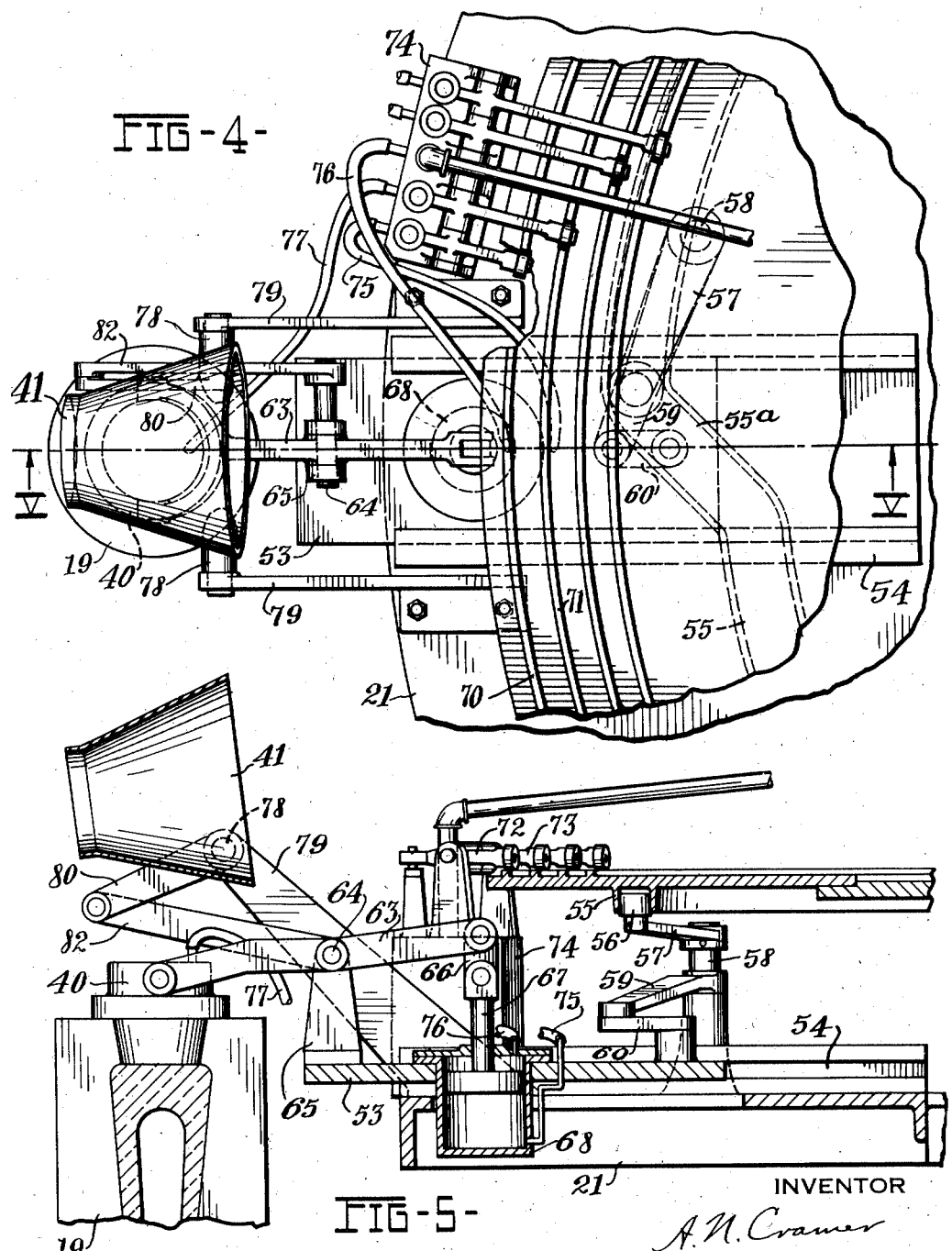

March 20, 1928.
A. N. CRAMER
GLASS FORMING MACHINE
Filed May 21, 1923     5 Sheets-Sheet 4
1,662,848
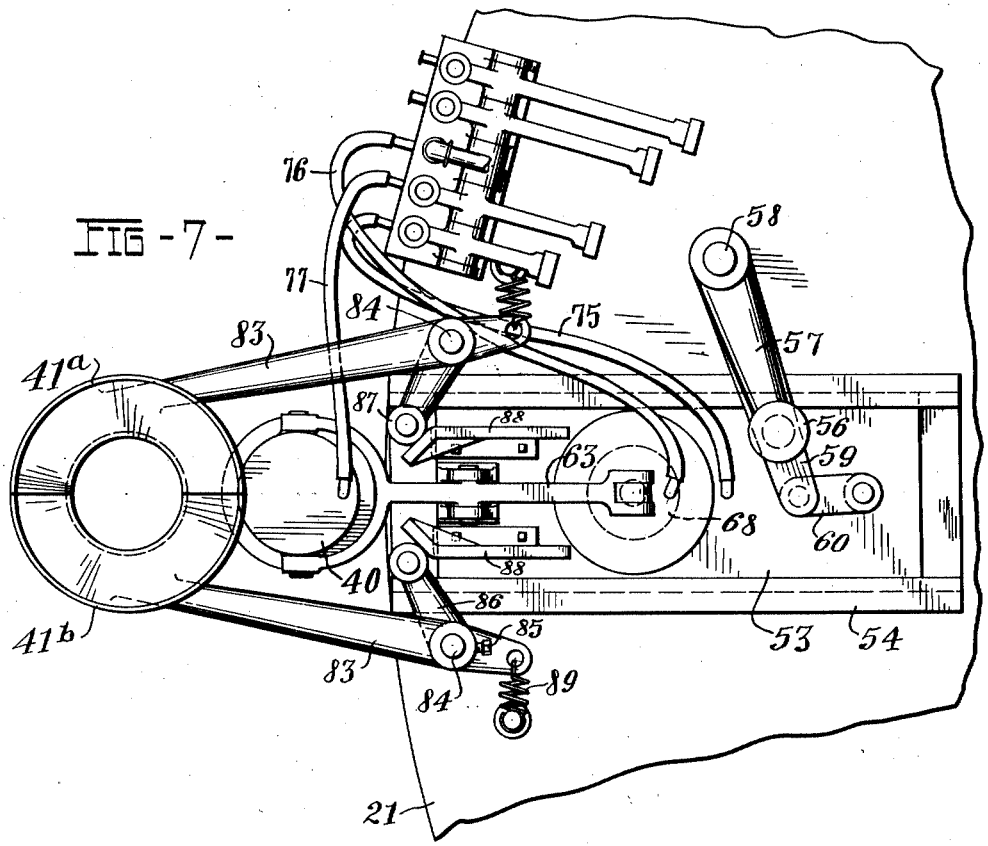
FIG-7-
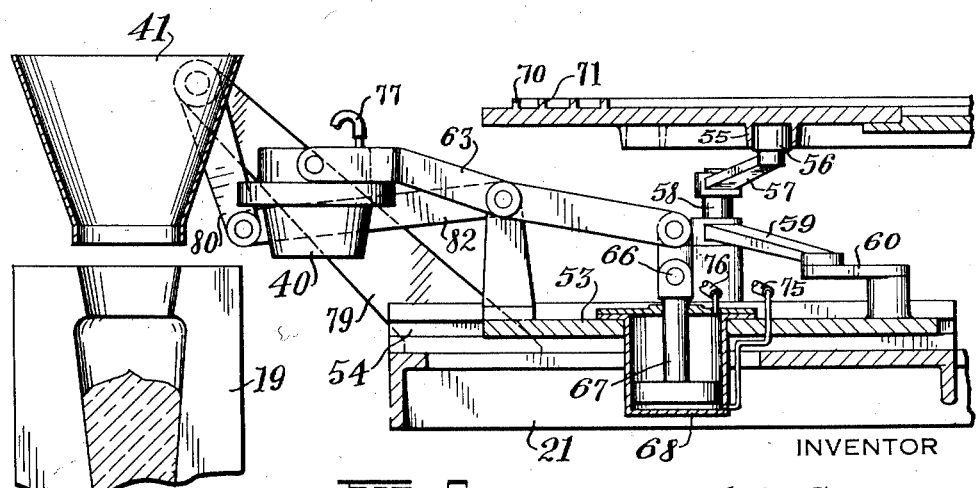
FIG-6-
INVENTOR
A. N. Cramer
By J. F. Rule
His attorney

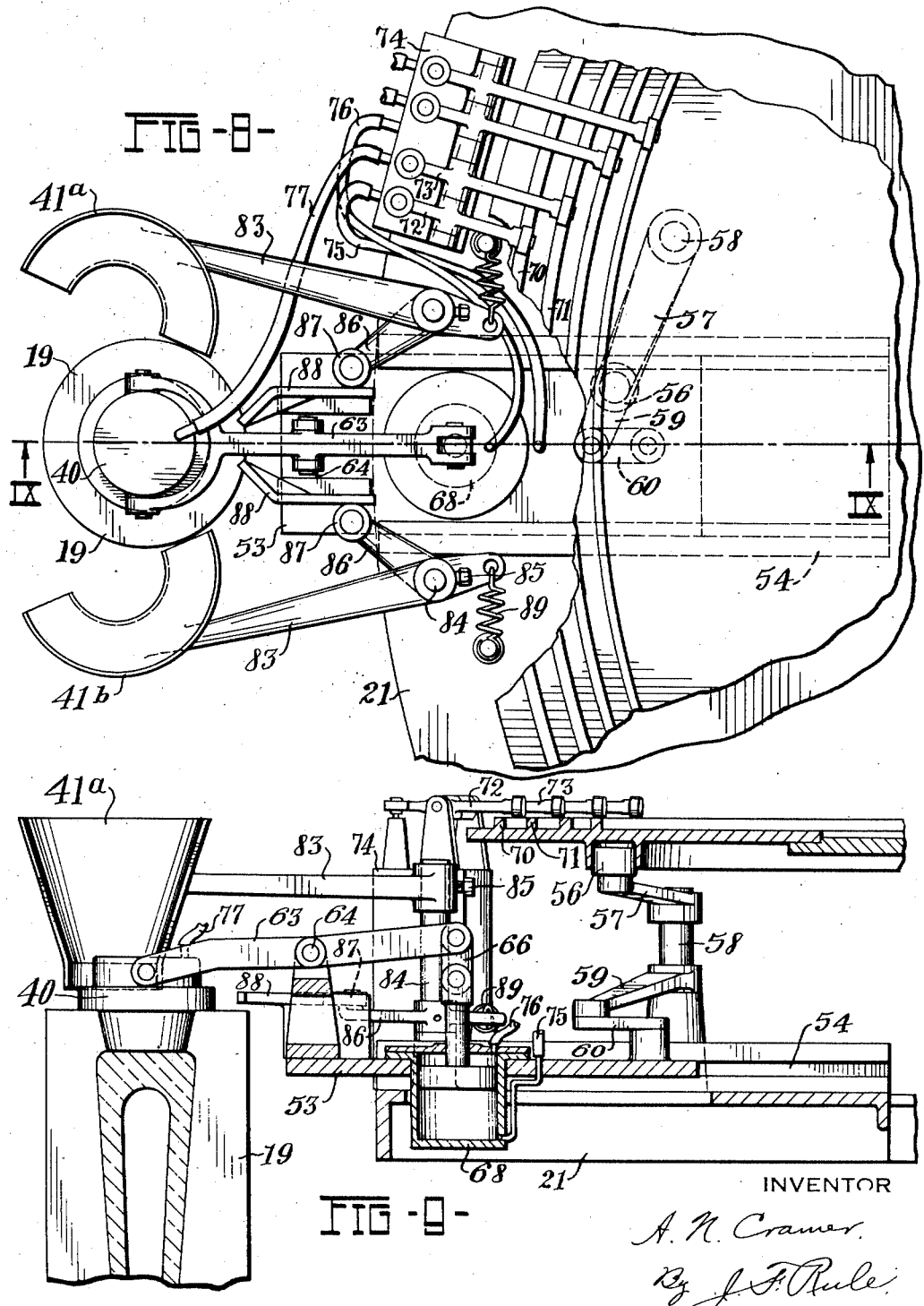

Patented Mar. 20, 1928.

1,662,848

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF TOLEDO.

GLASS-FORMING MACHINE.

Application filed May 21, 1923. Serial No. 640,286.

My invention relates to glass forming apparatus and particularly to gravity fed glass forming machines. It is customary to feed machines of this type by dropping the charges of glass into the open upper ends of inverted blank molds. When the charges are supplied by automatic feeders, particularly where the mold carriage rotates continuously, means such as funnel shaped guides, are ordinarily provided to guide the charges of glass into the molds as the latter pass the charging station. After a charge is received in the mold, a blow head is brought into position over the receiving end of the mold and air under pressure is supplied through said head for compacting and shaping the glass in the mold. The blow head may also serve as a forming plate or mold bottom when the parison is blown to hollow form by air supplied through the opposite end of the mold.

The present invention is herein shown in connection with a machine of the character above indicated and comprises an individual blow head and funnel guide for each blank mold. An object of the invention is to provide an improved form and arrangement of mechanism for actuating the blow heads and guides.

Other objects of the invention will appear hereinafter.

In the accompanying drawings:

Figure 1 is a sectional elevation of a glass blowing machine to which my invention is applied, parts being broken away.

Figure 2 is a top plan view of a portion of the machine.

Figure 3 is a sectional elevation at the line III—III on Figure 2.

Figures 4 and 5 are views similar to Figures 2 and 3 respectively, but showing a modified form of mechanism for actuating the funnel guides, Figure 5 being a section at the line V—V on Figure 4.

Figure 6 is a view similar to Figure 5, but with the parts in a different position.

Figures 7, 8 and 9 illustrate a further modification comprising partible funnel guides. Figure 7 is a plan view showing a guide and its actuating mechanism, the guide being in operative position. Figure 8 is a similar view, but with the guide sections separated and the blow head in position on the mold. Figure 9 is a section at the line IX—IX on Figure 8.

The invention is herein shown as applied to a glass blowing machine such as disclosed in the co-pending application of Richard La France, for glass blowing machines, Serial Number 532,606, filed January 30, 1922. It is to be understood, however, that the invention may be adapted to other types of machines.

The present application discloses certain features also disclosed in my co-pending application Serial Number 635,573, filed April 30, 1923.

Referring particularly to Figure 1, the machine comprises a central stationary column 15 on which the mold carriage is mounted for continuous rotation. The carriage comprises a lower section or table 16 on which are supported the finishing molds 17, an intermediate section 18 which carries the blank molds 19 and neck molds 20, and an upper section 21 on which the mold closing heads 40 and guides 41 are supported. The carriage is rotated continuously by means of a driving pinion 24 running in mesh with an annular gear 25 on the carriage.

The blank molds 19 are arranged in an annular series on the mold carriage, each mold comprising horizontally separable sections. Each mold is in the inverted position shown in Figure 1 when it reaches the charging station, with its upper end open to receive the charge of glass. At this time, the neck mold 20 is directly beneath and in register with the blank mold. After a charge has been dropped into the blank mold, the corresponding blowing head 40 is brought into position to close the upper end of the mold, and air is supplied in the manner hereinafter set forth, to compact the glass in the mold.

A head 26 carrying the blank mold and neck mold is then rotated about a horizontal axis to swing the blank mold and neck mold as a unit downward. This movement is effected by means of a pinion 27 driven by a gear segment 28 having an operating connection with a cam roll 29 running on a stationary cam track 30. After the blank mold has been swung downward, it is opened and reinverted, leaving the blank suspended from the neck mold. The finishing mold sections are now closed around the blank, said sections being actuated by a cam 32, after which the blank is blown to its final form. After the bottle has been blown, the finishing mold opens and the mold bottom 33 is tilted to discharge the bottle, said bottom being controlled by a stationary cam 34.

The charges of glass are supplied from an automatic feeder 44 which may be of any usual or approved construction and which operates in synchronism with the movement of the mold carriage to drop a charge 45 of glass into each blank mold as the latter passes beneath the feeder. The charge is guided into the mold by the funnel guide 41 directly over the mold at this time. As shown in Figures 1, 2 and 3, the guide is carried at the outer end of a rock arm 46 fixed to a rock shaft 47 journalled in brackets 48 on the upper section 21 of the mold carriage. An arm 49 also keyed to the rock shaft 47 carries a cam roll 50 which runs on a cam 52 on a slide plate 53, the latter being mounted for horizontal sliding movement radially of the mold carriage in guides 54 on the carriage. The sliding movements of the plate 53 are controlled by a stationary cam 55 on which runs a roll 56 on a rock arm 57 fixed to a rock shaft 58 on the carriage section 21. A rock arm 59 on said shaft is connected through a link 60 to the slide plate.

The blow head 40 is pivotally connected at 62 to the outer end of a lever 63 fulcrumed at 64 on a bearing bracket 65 on the slide plate 53. The inner end of the lever is connected through a link 66 to a piston rod 67 of an air motor 68 mounted on the slide plate.

The cam 55 is so shaped that it holds the slide 53 in its inner position shown in Figure 1 while the corresponding blank mold is beneath the feeder. The guide 41 is at this time in operative position directly over the mold. As the mold carriage continues its travel after the charge has entered the mold, the slide 53 is moved radially outward to the Figure 2 position, owing to the inclined portion 55ᵃ of the cam 55. As the slide is thus projected, the cam roll 50 is forced upward by the cam 52 on the slide, thereby rocking the shaft 47 and swinging the funnel guide upward to the Figure 3 position. The funnel guide is thus moved out of the way of the blow head 40 which advances with the slide to a position directly over the mold. During this outward movement of the slide, the piston of the motor 68 is down so that the blow head is elevated sufficiently to clear the mold. After the blow head reaches the position over the mold, air is admitted beneath the piston to lift the latter and thereby rock the lever 63 and lower the blow head to its seated position on the mold (Fig. 3). When the blow head is seated, air is admitted thereto and operates to compact the glass in the mold and cause it to form the neck of the bottle. A poppet valve 69 in the blow head is opened by the air pressure in the blow head to permit the passage of air, but automatically closes when the pressure is relieved, so that said head forms a complete closure for the end of the mold while the parison is later being blown to hollow form by air supplied through the neck mold.

Means for controlling a supply of air to the blow head and to the motor 68 include cams 70 and 71 which respectively operate valve levers 72 and 73 for opening valves in an air box 74 in which a constant supply of air under pressure is maintained. When the valve lever 72 operates, air is supplied through a pipe 75 leading to the motor 68 below its piston, thereby lifting the latter. When the supply through the pipe 75 is cut off, the piston is lowered by air pressure supplied through a pipe 76 which leads from the air box 74 to the upper end of the motor cylinder 68. When the valve lever 73 operates, it opens communication from the air box 74 through a pipe 77 to the blow head 40.

In the modification shown in Figures 4, 5 and 6, the funnel guide 41 is provided with trunnions 78 journalled in the outer ends of arms 79 bolted to the carriage section 21 on opposite sides of the slide plate 53. A rock arm 80 which may have a fixed connection at one end with a trunnion 78 is connected at its other end to a link 82 connecting the arm 80 with the fulcrum pin 64 of the lever 63. It will be seen that with this construction, the outward movement of the slide plate 53 will swing the funnel 41 from its operative position (Fig. 6) upward to the Figure 5 position, thereby permitting the blowing head to move to its position over the mold. The tilting movement of the funnel is about the axis of the trunnions 78, which axis is stationary with respect to the carriage.

Figures 7, 8 and 9 illustrate a further modification in which the funnel guide comprises partible sections 41ᵃ and 41ᵇ carried by arms 83 on rock shafts 84 having bearings in the table 21. The arms 83 are adjustable both vertically and rotatively on the shafts 84 and are held in adjusted position by set screws 85. Keyed to each rock shaft 84 is an arm 86 having a cam roll 87 to run on a cam 88. Springs 89 hold said rolls in engagement with their cams. The cams 88 are mounted on the slide plate 53 so that when the latter is projected, the funnel sections are swung apart to the Figure 8 position to give clearance for the blow head as the latter moves forward over the mold. When the slide is withdrawn, the sections of the funnel guides are swung together, as shown in Figure 7, under the influence of the springs 89.

Various modifications other than those herein disclosed may be resorted to within the spirit and scope of my invention.

What I claim is:

1. In a glass forming machine, the combination of a mold open at its upper end to receive a charge of glass, a guide normally arranged to direct the charge into the mold, a mold closing head adjacent one side of the mold, means to move said head into and out of position to close the upper end of said mold, and connections between said head and guide actuated by a movement of the head for moving the guide relatively to the head in a direction transverse to that of the head, into position to prevent interference with movement of the head.

2. In a glass forming machine, the combination of a mold carriage, a mold thereon, a mold closing head supported on the carriage in proximity to the mold, a guide supported on the carriage and normally positioned in advance of the head and in a position to direct charges of glass into the mold, means for moving said head into and out of position to close the upper end of said mold, and operative connections between said head and guide actuated by a movement of the head for moving the guide relatively to the head to a position to prevent interference with movement of the head.

3. In a glass forming machine, the combination of a mold carriage, a mold thereon, a slide on the carriage, a mold closing device, a guiding device for directing glass into the mold, one of said devices being mounted on the slide and the other said device being mounted separately from the slide, means to actuate said slide for moving the device thereon toward and from the mold, and connections between said devices for effecting a relative movement thereof.

4. In a glass forming machine, the combination of a mold carriage, a mold thereon, a slide on the carriage, a mold closing device, a guiding device for directing glass into the mold, one of said devices being mounted on the slide and the other said device being mounted separately from the slide, means to actuate said slide for moving the device thereon toward and from the mold, and operative connections between said devices for effecting a movement of said separately mounted device relatively to the device on the slide, in a direction transverse to the movement of said slide.

5. In a glass forming machine, the combination of a rotating mold carriage, a mold arranged to travel therewith, a slide on the carriage, a mold closing head carried on the slide, a guide for guiding glass into the mold, and means for moving said guide relatively to the slide, in a direction transverse to the direction of movement of the slide.

6. In a glass forming machine, the combination of a rotating mold carriage, a mold arranged to travel therewith, a slide on the carriage, a mold closing head carried on the slide, a guide for guiding glass into the mold, said guide mounted separately from the slide, and means actuated by the slide for moving the guide relatively to said head and away from the mold as said head advances toward the mold.

7. In a glass forming machine, the combination of a rotating mold carriage, a mold arranged to travel therewith, a slide on the carriage, a mold closing head carried on the slide, a guide for guiding glass into the mold, means for moving said slide and head toward and from the mold, and means for swinging the guide up and down relatively to said head as the latter moves toward and from the mold.

8. In a glass forming machine, the combination of a rotating mold carriage, a mold arranged to travel therewith, a slide on the carriage, a mold closing head carried on the slide, a guide for guiding glass into the mold, said guide being mounted to swing about an axis having a fixed relation to the carriage, and operating connections between said slide and the guide for swinging the latter relatively to the mold closing head.

9. The combination of a mold carriage rotatable about a vertical axis, a mold thereon, a slide mounted on the carriage for movement radially thereof, a mold closing head carried by the slide, a funnel guide mounted on the carriage separate from the slide, and operating connections between said slide and guide for moving the guide relatively to said head.

10. In a glass forming machine, the combination of a mold carriage, a mold thereon, a funnel guide on the carriage separate from the mold comprising partible sections, and means to move said sections together and cause them to meet over the mold, said guide constructed and arranged to permit a formed charge of glass to pass freely therethrough and be guided thereby into the mold when said sections are together.

11. In a glass forming machine, the combination of a mold carriage, a mold thereon open at its upper end to receive a charge of glass, and a funnel guide on the carriage separate from the mold comprising partible sections, said guide having an operative position over the mold with the sections together, said guide providing a passageway through which the formed charge of glass may pass freely and be guided thereby into the mold when said sections are together, the lower end of said guide having approximately the same diameter as said open end of the mold.

12. In a glass forming machine, the combination of a mold carriage, a mold thereon, a slide on said carriage, a mold closing head on said slide, means to actuate said slide and thereby move the head to and from a position over the mold, a funnel guide having horizontally separable sections, and cams on said slide operable to separate said sections as said head moves to position over the mold.

13. In a glass forming machine, the combination of a mold open at its upper end to receive a charge of glass, a funnel guide for directing the glass into the mold, said guide comprising separable sections separate from the mold, and means for actuating said sections, said sections when together providing a passageway through which the charge of glass is directed into the mold, the lower end of said passageway being in register with and of substantially the same diameter as the opening in the upper end of the mold.

14. The combination of a feeder for feeding charges of molten glass, a mold therebeneath, and a split funnel guide between the mold and feeder.

15. The combination of a glass feeder for delivering charges of molten glass, a mold therebeneath open at its upper end to receive a charge, a split funnel guide interposed between the feeder and the mold, and automatic means for separating the sections of the guide and thereby withdrawing it from its position between the feeder and mold.

16. The combination of means for periodically dropping charges of molten glass, a mold, means to periodically actuate the mold to bring its open upper end into position to receive a charge of glass, a funnel guide comprising separable sections, means for positioning the guide over the mold with said sections together, whereby a charge of glass is guided therethrough into the mold, and means for separating said sections and thereby withdrawing the guide from its guiding position over the mold.

17. The combination with means for periodically delivering charges of molten glass, of a glass forming machine comprising a mold carriage, molds thereon, means for actuating the carriage and thereby bringing the molds in succession to a charge receiving position beneath said first mentioned means, each mold when in said position having its upper end open to receive a charge, guides individual to the molds and each comprising horizontally separable sections, automatic means for bringing the sections of each guide together in a position over the corresponding mold when the latter is in charge receiving position, whereby the charge is guided into the mold, and means for separating said sections to withdraw the guide from its position over the mold.

18. An improvement in glass forming machines including a mold open at its upper end to receive charges of glass, a guide for directing the charges into the mold, a mold closing head, and means to move the head into and out of mold closing position; said improvement comprising means for moving the head to a position over the upper end of the mold, and means actuated by a movement of the head to cause moving of the guide relatively to said head in a different direction from that of the head and angularly from the path of travel of the head.

19. In a glass forming machine, a mold carriage, a mold thereon comprising complementary halves, and means for guiding charges of glass into the mold comprising complementary funnel halves individual to and cooperating with the mold halves.

Signed at Toledo, in the county of Lucas and State of Ohio, this 17th day of May, 1923.

ALBERT N. CRAMER.